United States Patent
Chimura et al.

[11] 3,993,834
[45] Nov. 23, 1976

[54] LIGHT TRANSMITTING FILAMENT

[75] Inventors: Kazuya Chimura, Otake; Takashi Kaneko, Tokyo; Shunichi Takashima, Otake; Ryuichi Nakazono, Otake; Masao Kawashima, Otake; Hiroyuki Ota, Otake; Kenji Tamura, Otake; Kazunori Kagawa, Otake; Kazushi Shimada, Otake; Toru Maeda, Otake; Hisao Anzai, Otake; Kenji Takoi, Otake; Kenichi Sakunaga, Otake, all of Japan

[73] Assignee: Mitsubishi Rayon Co., Ltd., Tokyo, Japan

[22] Filed: Nov. 22, 1974

[21] Appl. No.: 526,383

[30] Foreign Application Priority Data
Nov. 22, 1973  Japan............... 48-131390

[52] U.S. Cl. .................. 428/373; 428/378; 428/394; 428/421; 428/422; 428/910; 428/918; 428/520; 264/1; 264/171; 350/96 R; 526/328; 526/245

[51] Int. Cl.² ................ D02G 3/00; B32B 27/00

[58] Field of Search .......... 428/373, 374, 378, 394, 428/918, 910, 421, 518, 520, 522, 422; 264/171, 1; 350/96 R

[56] References Cited
UNITED STATES PATENTS

| | | |
|---|---|---|
| 3,647,612 | 3/1972 | Schrenk ............... 264/171 |
| 3,801,429 | 4/1974 | Schrenk ............... 264/171 |
| 3,900,453 | 8/1975 | Shimada ............ 260/86.1 E |
| 3,930,103 | 12/1975 | Chimura .............. 428/373 |

FOREIGN PATENTS OR APPLICATIONS 1,037,498   7/1966   United Kingdom

*Primary Examiner*—George F. Lesmes
*Assistant Examiner*—Ellis P. Robinson
*Attorney, Agent, or Firm*—Armstrong, Nikaido & Wegner

[57] ABSTRACT

There is provided a filament of improved light transmission having a sheath-core composite structure formed of a methyl methacrylate polymer core material and a fluorine-containing polymer sheath material. The light transmitting filament is characterized in that the methyl methacrylate polymer core material is prepared by the specific procedure of continuous bulk polymerization and subsequent removal of volatile contents, wherein the polymerization is performed in a continuously and thoroughly stirred reaction vessel at a low catalyst concentration and a relatively high temperature and with improved conversion. The light transmitting filament possesses an absorption coefficient (k) of no greater than $6 \times 10^{-3}$ cm$^{-1}$.

11 Claims, 9 Drawing Figures

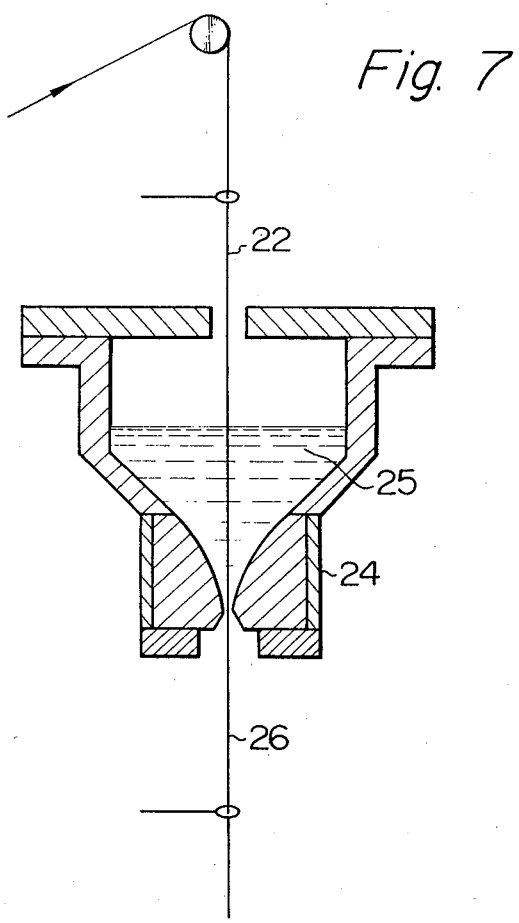
Fig. 7
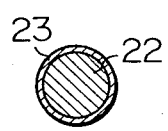
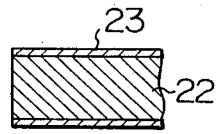
Fig. 8a      Fig. 8b

LIGHT TRANSMITTING FILAMENT

This invention relates to sheath-core composite filaments possessing improved capability of transmitting light over the lengths for use in flexible light transmitting bundles.

As is referred to in British Pat. No. 1,037,498, flexible light and image transmitting filament bundles have been heretofore formed of glass filaments. However, glass bundles are heavy, expensive and poor in flexibility. Accordingly, some proposals including the above British Patent having been made in recent years, wherein synthetic organic polymer filaments have been employed in substitution for such glass filaments.

In the above British Patent, sheath-core composite filaments are disclosed, which are formed of, as a core, polystyrene or an alkyl methacrylate polymer containing at least 70% by weight of units derived from an alkyl methacrylate, the alkyl group having 1 to 6 carbon atoms, and as a sheath, an alkyl methacrylate polymer containing at least 70% by weight of units derived from an alkyl methacrylate or a fluorine-containing polymer containing at least 30% by weight of fluorine. It is referred to in this British Patent that alkyl methacrylate polymers are the preferred filament core material for general applications of the light transmitting filament because of their high optical transparency, and for the combination with this filament core material, fluorine-containing polymers containing at least 30% by weight of fluorine are the preferred filament sheath material. Composite filaments referred to as preferred embodiments in the above British Patent possess light transmissions of approximately 24 to 70% per 1 m of the length, i.e. absorption coefficients (k), defined hereinafter, of approximately $14 \times 10^{-3}$ to $3.5 \times 10^{-3}$ cm$^{-1}$.

It now has been found that conditions under which an alkyl methacrylate polymer core material is manufactured greatly influence on the light transmission of the sheath-core composite filament. For example, polymethyl methacrylate manufactured by a suspension polymerization procedure, which is most commonly employed for the polymerization of methyl methacrylate in the art, has proved to give a light transmitting composite filament having an absorption coefficient (k) of approximately $6 \times 10^{-3}$ to $15 \times 10^{-3}$ cm$^{-1}$ at the filament core diameter of 0.5 mm, although this absorption coefficient range can be lowered to a slight extent if the manufacture of the light transmitting is carried out with scrupulous core. However, a methyl methacrylate polymer manufactured by the procedure specified hereinafter has proved to give a light transmitting composite filament possessing improved light transmission.

It is a main object of the present invention to provide a light transmitting sheath-core composite filament possessing improved light transmission.

Other objects and advantages of the present invention will be apparent from the following description.

In accordance with the present invention, there is provided a sheath-core composite filament having improved light transmission, formed of a core material consisting of a methyl methacrylate polymer containing at least 80% by weight of units derived from methyl methacrylate and a sheath material consisting of a fluorine-containing polymer containing at least 30% by weight of fluorine and having a refractive index of at most 1.42, characterized in that said methyl methacrylate polymer is prepared by the procedure of continuous bulk polymerization at a relatively high temperature and subsequent removal of volatile contents, wherein a monomer feed, containing 0.01 to 1.0% by mol of a mercaptan, and a free radical initiator in such a concentration that "A", which is a concentration of the free radical initiator in the monomer feed in terms of number of moles of the initiator present in 100 g of the monomer feed, and "B", which is a half life in hour of the free radical initiator at a polymerization temperature, satisfy the following realtions:

$$10 \leq A^{1/2} \cdot B^{-1/2} \times 10^3, 3 \leq A \cdot B \times 10^5 \text{ and } 2.9 \leq A^{-1}(B + 10.3) \times 10^{-6}$$

is continuously fed to a polymerization zone, a reaction mixture in said polymerization zone being thoroughly stirred and kept at a temperature of above 130° C and below 160° C, while maintaining a polymer content (in % by weight) in said reaction mixture substantially constant and so as to satisfy the following relation:

$$50 < \phi < 70 \exp(0.0121T - 1.81)$$

wherein T represents the polymerization temperature in ° C, thereby effecting polymerization, continuously withdrawing the reaction mixture from the polymerization zone and finally continuously removing volatile contents mainly composed of unreacted monomers.

To sum up, the main feature of the light transmitting composite filament of the present invention resides in the methyl methacrylate polymer filament core material which is prepared by the specific procedure of continuous bulk polymerization and subsequent removal of volatile contents wherein the polymerization is carried out at a relatively high temperature and a low catalyst concentration using a continuously and thoroughly stirred reaction vessel and with a high conversion. This methyl methacrylate polymer is characterized by being completely pure and free of foreign matter. The methyl methacrylate polymer further possesses improved thermal stability and, accordingly, is not degraded or is degraded only to a slight extent while being melt-extruded into filaments. Consequently, the sheath-core composite filament formed of this methyl methacrylate polymer filament core material has improved light transmission. The absorption coefficient (k), as defined hereinafter, of the sheath-core composite filament is usually within the range of $1.6 \times 10^{-3}$ to $6.0 \times 10^{-3}$ cm$^{-1}$ at a filament diameter of 0.5 mm. It falls particularly within the range of $1.0 \times 10^{-3}$ to $3.5 \times 10^{-3}$ cm$^{-1}$ if the conditions under which the filament core material is manufactured are more suitably selected.

Most methyl methacrylate polymers have been heretofore prepared by procedures of suspension polymerization or emulsion polymerization, or bulk polymerization at a relatively low temperature, i.e. below 100° C. However, such methyl methacrylate polymers are not satisfactory because of poor light transmission. This is due to the fact that such polymers, first, contain more than a negligible quantity of foreign matter even if the amount of additives such as a dispersing agent added to the polymerization system is reduced as much as possible and, second, are poor in thermal stability and therefore degraded while being melt-extruded into filaments at 200° to 280° C, whereby undesirable products of low molecular weights are formed therein.

Methyl methacrylate polymers to be used as a filament core material comprise either a homopolymer of methyl methacrylate or a copolymer containing at least 80% by weight, preferably at least 85% by weight, of methyl methacrylate units and up to 20% by weight, preferably up to 15% by weight, of units derived from at least one alkyl acrylate and alkyl methacrylate other than methyl methacrylate. The alkyl acrylates which may be employed to copolymerize with methyl methacrylate may be selected from alkyl acrylates having 1 to 18 carbon atoms in the alkyl moiety, and include, for example, methyl, ethyl, n-propyl, n-butyl, 2-ethylhexyl, dodecyl and stearyl acrylates. The alkyl methacrylates which may be employed to copolymerize with methyl methacrylate may be selected from alkyl methacrylates having 2 to 18 carbon atoms in the alkyl moiety, and include for example, alkyl methacrylates having any of the alkyls, other than methyl, given as examples above with respect to the suitable alkyl acrylates. The alkyl group of the alkyl acrylates or methacrylates may optionally contain an aromatic hydrocarbon substituent. Illustrative of such an alkyl group is benzyl. Among others, we prefer a hompolymer, i.e. polymethyl methacrylate and copolymers of methyl methacrylate with an alkyl acrylates selected from methyl, ethyl and butyl acrylates.

The process of preparing the methyl methacrylate polymer comprises two steps which are a polymerization step and a volatile removing step. In the polymerization step, the monomer feed containing methyl methacrylate is subjected to continuous bulk polymerization in one reactor or in two or more reactors in series, with the preference to the use of one single reactor, while the volatile removing step, volatile contents mainly composed of unreacted monomers are removed.

In the polymerization step, a methyl methacrylate monomer feed (which may contain one or more comonomers) containing 0.01 to 1.0% by mole of mercaptan, and a hereinabove defined amount of a free radical initiator is continuously fed to a polymerization zone.

It is to be understood that the free radical initiator to be used in accordance with the invention is one which satisfies the parameters of the above discussed equations as to half life. As a practical matter, it has been found that free radical initiators having a half life at the reaction temperature of at least 0.01 hour, and more preferably at least 0.035 hour, should be used in the process of the invention. As examples of such free radical initiators may be mentioned organic peroxides such as di-tert.-butyl peroxide, di-cumyl peroxide, methyl ethyl ketone peroxide, di-tert.-butyl di-perphthalate, di-tert.-butyl perbenzoate, tert.-butyl peracetate and di-tert.-amyl peroxide, and; azo compounds such as azobisisobutanol diacetate, 1,1-azobiscyclohexane carbonitrile, 2-phenylazo-2,4-dimethyl-4-methoxyvaleronitrile and 2-cyano-2-propylazo-formaldehyde. These free radical initiators may be employed alone or in combination, although it is preferred to use a single initiator since control of the polymerization is complicated with two or more initiators. Of these initiators, di-tert.-butyl peroxide is the most preferred.

An amount of the free radical initiator contained in the monomer feed should be controlled in such a manner that "A", which is a concentration of the free radical initiator in the monomer feed in terms of number of moles of the initiator present in 100 g of the monomer feed, and "B", which is a half life in hour of the free radical initiator at a polymerization temperature, satisfy the following relations:

$$10 \geq A^{1/2} \cdot B^{-1/2} \times 10^3 \quad (1)$$

$$3 \geq A \cdot B \times 10^5 \quad (2)$$

and $$2.9 \geq A^{-1}(B + 10.3) \times 10^{-6} \quad (3)$$

We have found that when a value of $A^{1/2} \cdot B^{-1/2} \times 10^3$ exceeds 10 the methyl methacrylate polymer tends to become poorer in thermal stability and results in a composite filament of poor light transmission. This value should be not more than 10, and is preferably not more than 6. We have also found that if a value of $A \cdot B \times 10^5$ is greater than 3 undesirable adhesion of polymer to the employed apparatus will occur. We prefer to select a suitable initiator and its concentration in the monomer feed to make this value not more than 2.5. We have further found that as a value of $A^{-1}(B + 10.3) \times 10^{-6}$ exceeds 2.9, by-products, particularly oligomers tend to be produced. Although a substantial part of the oligomers can be removed in the subsequent volatile removing step, this value should preferably be kept not more than 2.9 and more preferably not more than 2.0 in order to suppress the formation of oligomers.

As described, we employ a limited class of initiators having a relatively long half life. A particular concentration of the initiator in the monomer feed depends on the particular initiator and the particular polymerization temperature. It should be noted, however, that the concentration of the initiator employed is extremely low, when compared with the levels at which the same initiator has been employed in prior art processes.

The range of a concentration of initiator employed in a process of the invention and defined by these relations (1), (2) and (3) is graphically shown in FIG. 1 of the attached drawing. In FIG. 1, the curves (a), (c) and (b) correspond to the equations:

$$10 = A^{1/2} \cdot B^{-1/2} \times 10^3 \quad (1)$$

$$3 = A \cdot B \times 10^5 \quad (2)$$

and $$2.9 = A^{-1}(B + 10.3) \times 10^{-6} \quad (3)$$

respectively, each showing the critical concentration defined by each of the relations, of initiator in the monomer feed (in number of moles of the initiator in 100 g of the monomer feed) as a function of a half life (in hour) of the initiator at the polymerization temperature. Thus, any point within the hatched area shown in FIG. 1 represents a possible combination of a concentration of initiator in the monomer feed and a half life of the initiator, which may be employed in the practice of the invention.

By the term "a half life of the free radical initiator at a polymerization temperature" referred to herein, we mean a half life of the initiator in a diluted solution in benzene maintained at the same temperature as the polymerization temperature. This may readily be determined by procedures described in Modern Plastics, 1959, February, page 144. For example, di-tert.-butyl peroxide and di-cumyl peroxide have values of a half life of 1.0 and 0.23 in hours at 150° C, respectively.

The initiator concentration defined by the three relations (1), (2) and (3) set forth above is characterized as being very low as compared to those comployed in known, practical polymerization procedures such as a suspension polymerization. For example, when di-tert.- butyl peroxide is used as an initiator, the concentration thereof is usually approximately 0.001% by weight.

Illustrative of suitable mercaptans which may be added to a monomer feed in a process of the invention one can mention those having 3 to 18 carbon atoms; for example, primary aliphatic mercaptans such as n-propyl, n-butyl, n-pentyl, isopentyl, neopentyl, n-hexyl, isohexyl, n-heptyl, n-octyl, n-decyl, n-dodecyl, n-tetradecyl, n-hexadecyl and n-octadecyl mercaptans; secondary aliphatic mercaptans such as isopropyl, sec-butyl, sec-pentyl, sec-hexyl, sec-heptyl, sec-octyl, sec-nonyl and sec-decyl mercaptans; tertiary aliphatic mercaptans such as tert-butyl, tert-hexyl, tert-heptyl, tert-octyl, tert-nonyl and tert-dodecyl mercaptans; and aromatic mercaptans such as phenyl mercaptan, 4-tert.-butyl-$\phi$-thiocresol and 4-tert-butylthiophenol. These may be employed alone or in combination. Of these mercaptans, we have found that tert.-butyl, n-butyl, n-octyl and n-dodecyl mercaptans are preferred.

The mercaptans are employed in an amount of from 0.01 to 1.0% by mole based on the monomer feed. With less than 0.01% by mole, a polymerization velocity tends to increase abnormally and control of the reaction often becomes difficult. Consequently, it is difficult to obtain products having no variation in properties and having a good filament-forming property. Whereas, with a substantial excess of mercaptan, a polymer of a reduced polymerization degree is produced, and filaments made therefrom will have poor mechanical properties. Preferred amounts of the mercaptans depend on a particular mercaptan to be employed. For example, in case of n-dodecyl mercaptan, an amount of 0.1 to 0.2% by mole is preferred, and in case of tert.-butyl mercaptan 0.2 to 0.45% by mole.

In a polymerization zone, the reaction mixture which is being polymerized and to which the monomer feed is being continuously added at a selected constant rate should be thoroughly stirred and kept at a temperature of above 130° C and below 160° C. When a temperature of the reaction mixture (hereinafter referred to as "a polymerization temperature") is substantially lower than 130° C, it becomes difficult to ensure uniform mixing and heat transfer due to high viscosity of the polymerizing reaction mixture and, in consequence, it is difficult to control the polymerization and to raise the conversion. As a polymerization temperature is raised, the reaction mixture will have an increased fluidity, but tendencies to formation of by-products and to reduction in heat resistance will appear. For these reasons a polymerization temperature is selected within the range between 130° C and 160° C, and preferably from 140° C to 160° C.

Since heat is created in the reaction mixture by the exothermal reaction and the action of vigorous stirring, the reaction mixture should be kept at a predetermined temperature usually by heat removal. In some cases the reaction mixture may be heated. This temperature control may be carried out by any of known techniques including circulation of a heat transfer medium through a jacket, a draft tube or a coil, supplying a cooled monomer feed and reflux cooling.

With a conversion exceeding the critical value, $70 \exp(0.0121T - 1.81)$, defined by the relation (4), the required uniform mixing and heat transfer become difficult. Whereas a conversion of 50% or less makes it difficult to fully utilize a rapid increase in reaction velocity due to "gel effect" and results in products containing unreacted monomers in a major proportion, which require an increased cost for volatilization. In general, it is preferred to maintain $\phi$ less than the upper critical value by the order of several per cent. Upper critical values are, for example, 62.4% at 140° C, 70.3% at 150° C, and 79.6% at 160° C.

A reactor which may be employed for the polymerization may be of a vessel type equipped with a suitable stirrer for mixing high viscosity materials. Incidentally, a polymerization reactor of a so-called "plug flow type" wherein a monomer feed is introduced thereinto at one end and advances slowly toward the other end from which a polymerized mass is withdrawn, and wherein a reacting liquid is mixed in directions perpendicular to the axis of the reactor, but not in a direction parallel to the axis of the vessel is not suitable for use in the practice of the invention. Such unsuitable polymerization reactors the invention are for example, a screw extruder type as described in U.S. Pat. No. 3,234,303, an elongated reactor type as described in U.S. Pat.No. 3,637,545, a tower type as described in U.S. Pat. No. 3,252,950, and other tubular or duct type polymerization reactors.

In the volatile removal step, the polymerization mixture having a stated polymer content, which is continuously fed from the polymerization reactor, is generally heated at temperatures of about 200° C to about 290° C under a reduced pressure, whereby most parts of the volatile contents mainly composed of remaining unreacted monomers are removed therefrom. A remaining monomer content in the final product is usually 1% by weight or less, preferably 0.3% by weight or less. Unreacted monomer which has been separated may be recovered and re-used.

Apparatus which may be employed for the removal of volatiles are of a type generally called a vent-extruder, a devolatilizer or a volatile removing extruder. These include, for example, those described in "Modern Plastics Encyclopaedia" Vol. 45 (October, 1968), Vol. 46 (October 1969), published by McGraw-Hill Publishing Co,; U.S. Pat. Nos. 2,434,707, 2,736,058, 2,753,595 and 2,774,105.

A polymer product from which volatile contents have been removed is extruded in a molten state through an appropriate die to be formed into desired shapes such as pellets.

In order that the invention may be more fully understood, reference is made to the accompanying drawings in which.

Figure 4:
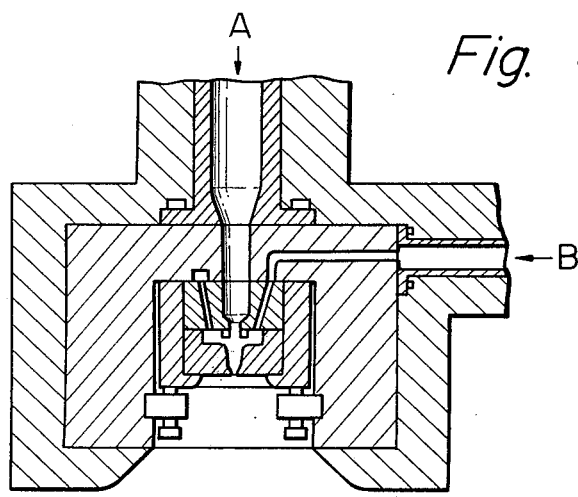
Figure 6:
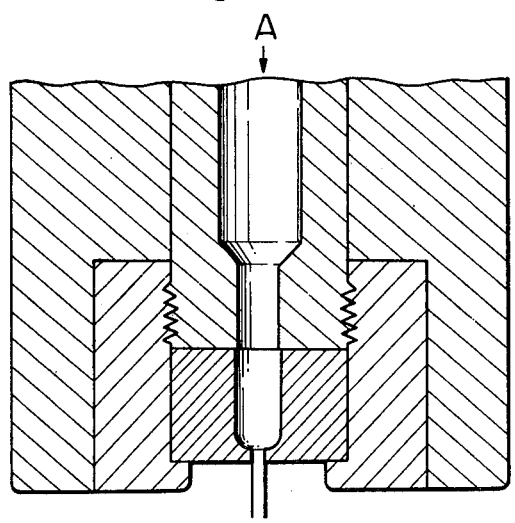

FIGS. 4 ad 5 show spinnerette assemblies for extruding the sheath-core composite filament;

FIG. 6 shows a spinnerette assembly for extruding the filament core material;

FIG. 7 shows an apparatus for coating the filament core with a solution of the filament sheath material, and;

FIGS. 8a and 8b are cross-sectional views of the sheath-core composite filament.

Figure 1:
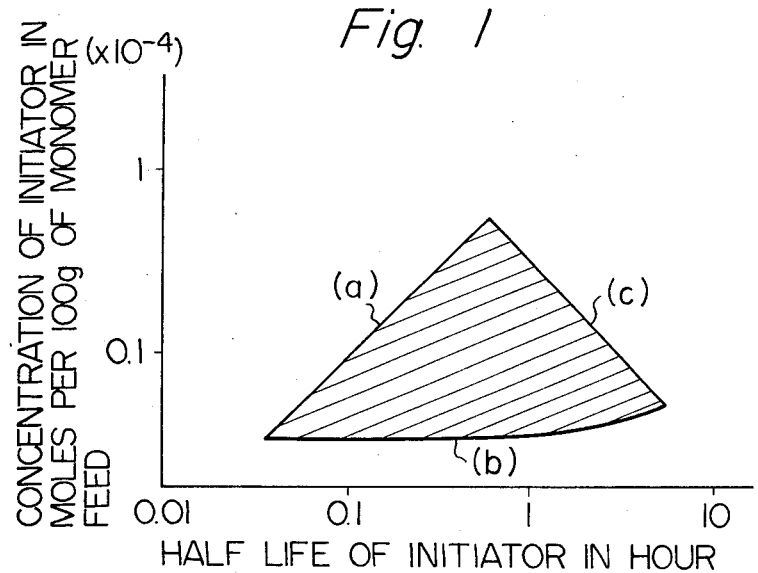
FIG. 1 shows the relation of the concentration of initiator v.s. half life of initiator, as set forth hereinbefore.
Figure 2:
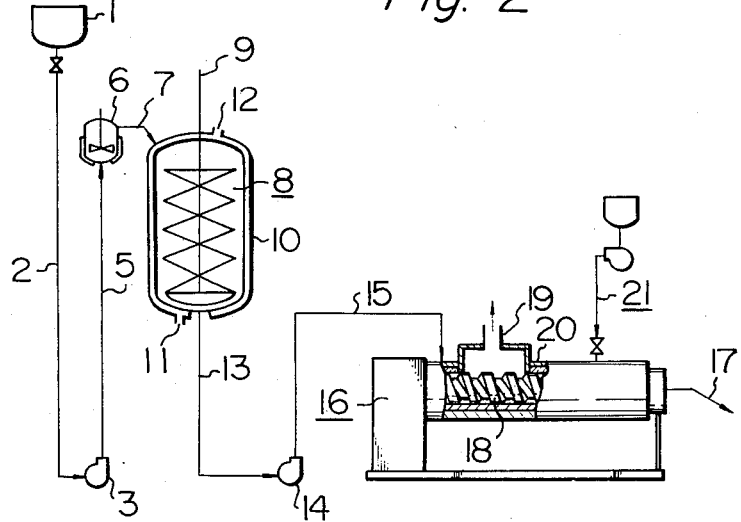
FIG. 2 is a diagrammatic view of the apparatus employed for manufacturing the filament core material.

One typical apparatus preferably employed for the manufacture of the methyl methacrylate polymers will be further illustrated with reference to FIG. 2. With reference to FIG. 2, a monomer feed is fed from reservoir 1 to a heat-exchanger 6 via lines 2 and 5 by means of a pump 3. The heat-exchanger 6 is a closed vessel type provided with an outer cooling jacket with a coil and a turbine type stirrer. The monomer feed which has been conditioned in the heat-exchanger 6 is then fed to a reactor 8 via a line 7. The reactor 8 is equipped with a stirrer 9 of a spiral ribbon type and a jacket 10 through which a heat transfer medium is caused to flow from an inlet 11 to an outlet 12 so as to maintain a reaction mixture in the reactor at a predetermined temperature. The reaction mixture is discharged from the reactor 8 through a line 13 and passed by means of a pump 14 through a line 15 to a devolatilizor 16 provided with a screw 18, a vent 19, a heating or cooling means 20 and a system 21 for optionally adding additives. A polymer separated from the volatiles is extruded by means of the screw 18 through the die in the form of strand 17. The volatiles, which are mainly composed of unreacted monomers, are separated from the polymer by applying a reduced pressure through the vent 19, and recovered.

If desired the following additives may be incorporated into the methyl methacrylate polymer, alone or in combination, in an amount such that the light transmission of the resulting methyl methacrylate polymer filament cannot be appreciably reduced by the addition thereof. The additive employed includes, for example, plasticizers or lubricants such as stearyl alcohol and ultra-violet absorbers such as "Tinnvin P" (Trade name, supplied by Ciba-Geigy A.G.). These may be incorporated in the polymerization or volatile removing steps, or after the volatile removing step. In most cases, it is preferred to incorporate these additives after the polymerization step.

The methyl methacrylate polymer prepared by the procedure set forth above is characterized as being superior to conventional methyl methacrylate polymers in purity and homogeneity as well as thermal stability.

Figure 3:
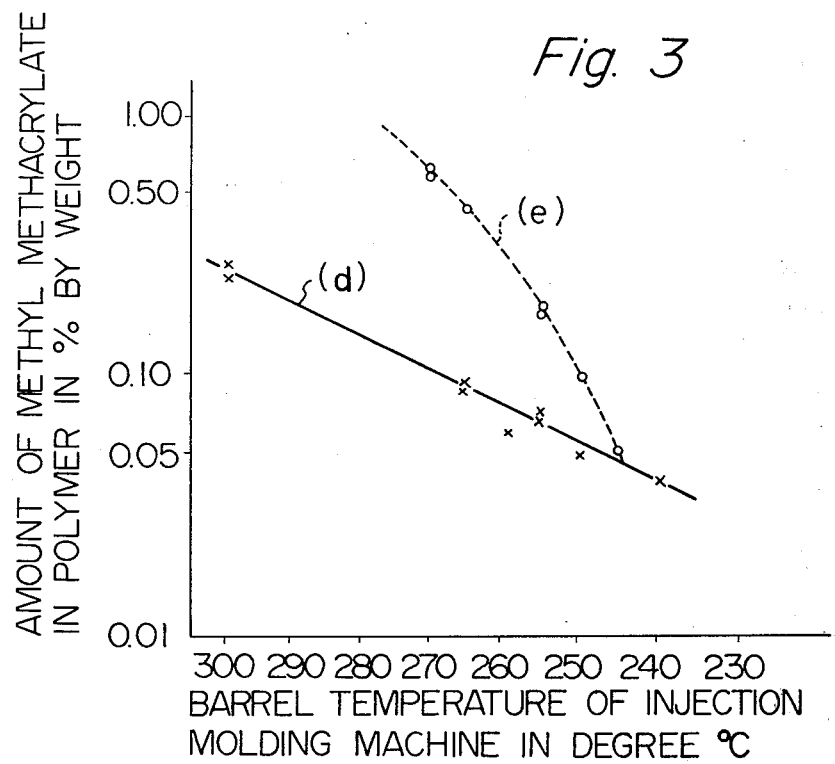
FIG. 3 shows the resistance to thermal degradation of the methyl methacrylate polymer core material (d) of the invention and that (e) of a prior art.

FIG. 3 shows the resistance to thermal degradation of the methyl methacrylate polymer used in the present invention (d) and of a conventional methyl methacrylate polymer(e) prepared by a suspension polymerization procedure. Both the polymers consist of 95% by weight of methyl methacrylate and 5% by weight of methyl acrylate. Each polymer was molded by an injection molding machine with a cycle of 60 seconds, and the amount of methyl methacrylate produced by the thermal degradation of polymer during the injection molding was measured. In FIG. 3, the abscissa shows the barrel temperature of the injection molding machine and the ordinate shows the amount of methyl methacrylate contained in the molded methyl methacrylate polymer in % by weight based on the polymer.

The methyl methacrylate polymer is characterized as further having a narrower molecular weight distribution than conventional methyl methacrylate polymers. Further, in the case of copolymer, the ratio of the monomers is constant over the entire copolymer, leading to enhancement of the light transmission.

The sheath filament material of the light transmitting composite filament of the invention should have a refractive index of at most 1.42 in order to prevent as much as possible the reduction in the light transmission of the core.

Such a sheath material is a fluorine-containing polymer, containing at least 30% by weight of fluorine, which includes, for example, homopolymers and co-polymers of vinylidene fluoride, tetrfluoroethylene, hexafluoropropylene and fluorinated esters of acrylic or methacrylic acid represented by the general formula (4)

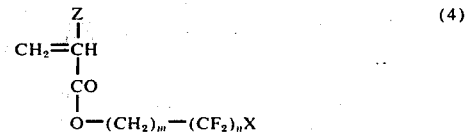

where X is selected from H, F and Cl, n is an integer of 1 to 10, $m$ is an integer of 1 to 5 and Z is either $CH_3$ or H, or the general formula (5)

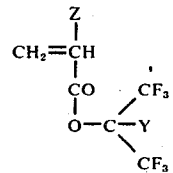

where Y is either $CF_3$ or H and Z is the same as that defined above.

Illustrative of such fluorine-containing polymers which are preferably employed in the invention are poly-2,2,2-trifluoroethyl methacrylate, a copolymer of at least 50% by mole of 2,2,2-trifluoroethyl methacrylate and at most 50% by mole of 2,2,3,3,4,4,5,5-octafluoropentyl methacrylate or 2,2,3,4,4,4-hexafluorobutyl methacrylate, poly-1,1,1,3,3,3-hexafluoropropyl methacrylate, a copolymer of at least 50% by mole of 1,1,1,3,3,3-hexafluoropropyl methacrylate and at most 50% by mole of 2,2,3,3,4,4,5,5-octafluoropentyl methacrylate of 2,2,3,4,4,4-hexafluorobutyl methacrylate, poly-2,2,3,4,4,4-hexafluorobutyl methacrylate, a copolymer of at least 50% by mole of 2,2,3,4,4,4-hexafluorobutyl methacrylate and at most 50% by mole of 2,2,3,3,4,4,5,5-octafluropentyl methacrylate and a copolymer of 60 to 80% by mole of vinylidene fluoride and 20 to 40% by mole of tetrafluoroethylene.

The manner whereby the filament sheath material is prepared is not critical because the light transmission of the resulting composite filament is not dependent upon the particular manner for the preparation so much as in the preparation of the filament core material. The filament sheath material may be prepared by any known method including those disclosed in German Offenlegungschrift No. 2,125,350, provided that core is taken for preventing incorporation of foreign matter into the sheath material.

The method whereby the sheath-core composite filament of the invention is prepared from the core and sheath materials as set forth above is not critical and any known method may be employed. The methods of preparing the composite filament may be divided broadly into two types.

Figure 5:
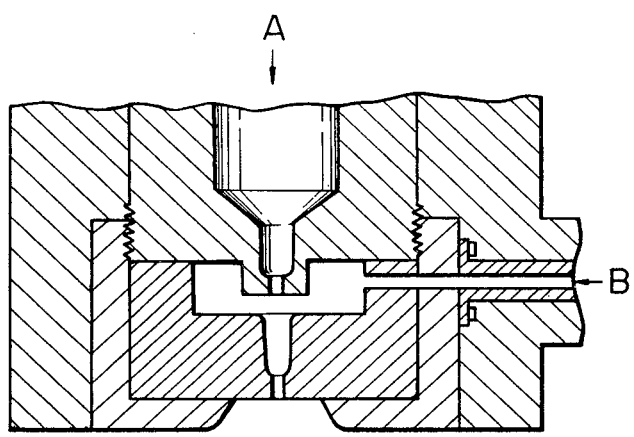

One type involves the employment of the spinnerette assembly as shown in FIG. 4 or 5, where the methyl methacrylate polymer is extruded as a core A concentrically surrounded by the fluorine-containing polymer as a sheath B. The extruded composite filament has a structure as shown in FIGS. 8a and 8b, which consists of the core 22 and the sheath 23. Both the filament core and sheath materials need not always be supplied in the form of pellets but may be supplied in other forms such as a finaly divided powder, to an extrusion apparatus provided with the spinnerette assembly set forth above. It is also possible that the methyl methacrylate polymer, which has been continuously discharged in the form of strand from the course of bulk polymerization and removal of volatile contents, as set forth in detail hereinbefore, is directly supplied to the extrusion apparatus without pelleting.

The temperature at which the filament sheath and core materials are extruded through the spinnerette assembly varies depending upon the particular sheath and core materials employed, and usually within the range from 180° to 280° C and preferably 200° to 265° C. Melting viscosities of the sheath and core materials should be as close as is practically possible to each other in order to produce a composite filament of improved uniformity. The melt viscosity may be varied by suitably selecting the molecular weight of the sheath or core material on the amount of a comonomer.

The extruded composite filament may be orientated in the molecules in order to impart improved flexibility. This orientation may be performed by drawing the filament usually 1.3 to 2.5 times its original length in a stage after the extrusion.

The other type of method of preparing the composite filament involves the employment of the spinnerette assembly for extruding a non-composite filament to be formed into the core, as shown in FIG. 6, and of the coating apparatus for coating the non-composite filament with the sheath material, as shown in FIG. 7. In this type method, the methyl methacrylate polymer is extruded alone through the spinnerette assembly as shown in FIG. 6 and cooled thereby to be formed into a non-composite filament. The non-composite filament, optionally after it is drawn, is coated with a solution of the fluorine-containing polymer and then, dried. With reference to FIG. 7, the filament core material 22 is passed through a bath 25 of a concentrated solution of the filament sheath material, and discharged from a die 24. The coated filament 26 is then heated at a predetermined temperature whereby the solvent is removed from the coated sheath material layer.

Most preferable solvents used for the preparation of the filament sheath material solution are those which are capable of dissolving the filament sheath material but incapable of dissolving the filament core material. However solvents which are capable of dissolving the filament core material may be used, provided that the filament sheath material solution is of a high concentration, because the core is influenced only to a neglegible extent by the sheath solution of a high concentration. Preferable solvents depend upon the particular filament sheath material employed but, usually, include hologenated hydrocarbons such as 1,1,2-trifluoro-1,2,2-trichloroethane; ketones such as acetone, methyl ethyl keton and methyl butyl ketone; acid amides such as dimethylformamide and dimethylacetamide; acetic acid esters such as methyl acetate, ethyl acetate, propyl acetate and butyl acetate; and the fluorinated esters of acrylic or methacrylic acid represented by the general formular (4) or (5), set forth above, which are monomers used for the polymerization for the filament sheath material. Of these, most preferable are, for examples, hologenated hydrocarbons and ethyl acetate for the filament sheath material from the fluorinated esters of methacrylic acid; and ethyl acetate for the vinylidene fluoride copolymer filament sheath material. The concentration of the filament sheath material in the solution may be varied usually within the range from 10 to 60% by weight and preferably within the range from 20 to 50% by weight.

Over the entire processes of manufacturing the filament sheath and core materials and the composite filament from the sheath and core materials, care should be taken so as to prevent or avoid the incorporation of minute dust, gases such as air, absorbed water, and other foreign matter into the materials and the formation of thermally degraded products such as low molecular weight coagulates or carbonized products. Such foreign matter and thermally degraded products lead to reduction in optical properties of the composite filament.

The process for the preparation of the methyl methacrylate polymer core material of the invention is advantageous from the standpoint that the polymer possesses enhanced thermal stability and purity, i.e. contains no or little foreign matter.

When the molten methyl methacrylate polymer withdrawn from the step of removing volatile contents is fed immediately and directly, i.e. without being formed into pellets or other shapes, to the spinning apparatus for melt-extruding the composite filament, the incorporation of foreign matter and the formation of thermally degraded products can be far more reduced. Such a continuous polymerization-spinning system is advantageous also in that it effects an economy in heat.

In one preferred embodiment of the apparatus employed in a such continuous polymerization-spinning system, a small conduit, through which a part of each molten polymer is capable of being discharged, may be provided immediately upstream to the spinnerette assembly of the spinning apparatus for the composite filament. This conduit allows a surplus of each molten polymer to be discharged from the spinning apparatus when the flow rate of each molten polymer fluctuates and, therefore, the extrusion rate of the polymer can be maintained constant. Further this conduit allows minute particles of foreign matter, which are liable to stagnate in the dead space of the spinning apparatus, to be discharged therefrom, and this leads to further enhancement of the light transmission of the composite filament.

The invention will be further specifically described by the following illustrative, but not limitative, examples in which all percentages and parts are by weight unless otherwise specified.

The absorption coefficient (k) which is a standard for evaluating the light transmission was determined by a procedure similar to that described in British Pat. No. 1,037,498. That is, by using a conventional tungsten light bulb as a standard "white" light source, the light was focussed on one end of a group of fibers having approximately 2m length. The intensity of the transmitted light was measured by means of a phototube exhibiting the maximum sensitivity to light having an approximately 540 m$\mu$ wave length, provided in an integrating sphere. Then the fibers were shortened by about 20 cm and the transmitted light was again measured. By repeating this process of cutting the fibers and measuring the transmitted intensity after each cut, a graph was made of the logarithm of the intensity vs. length, the slope of which is the absorption coefficient (k). This absorption coefficient (k) is represented by the formula $$I = I_o e^{-kl}$$

where $I$ and $I_o$ are the intensities of the transmitted light and the incident light, respectively, $e$ is the natural logarithmic base and $l$ is the fiber length in cm.

EXAMPLE 1

Using a system as shown in FIG. 2, a methyl methacrylate copolymer to be used as a core component of the composite filament was prepared in the following manner. Specifications of the employed apparatus were as follows: A polymerization reactor having an innner volume of 300 ml; an extruder as a devolatilizor having a twin-screw, each of a 90 mm inner diameter and a 1,200 mm length, with a vent portion of 600 mm in length.

A monomer feed essentially consisting of 87 parts of methyl methacrylate, 13 parts of methyl acrylate, 0.23 part of n-octyl mercaptan and 0.0017 parts (i.e. 0.113 $\times 10^{-4}$ mol of the initiator/100 g of the monomer feed) of di-tert.-butyl peroxide (having a half life of 1 hour at 150° C) was prepared while being prevented from contacting air, conditioned to a temperature of 30° C in a heat-exchanger and continuously fed to a reactor at a rate of 15 l/hr. An internal pressure of the reactor was set to 8 kg/cm² gauge by nitrogen. A polymerization temperature was set to 150° C. After 7.8 hours, a flow rate of feed was raised to 25 l/hr, and a steady operation was started. In the reactor the reaction mixture was thoroughly mixed by means of a stirrer rotated at a rate of 90 rpm. At a steady state, a residence time in the reactor was 4.7 hours, and the reaction mixture immediately after leaving the reactor contained 64% by weight of polymer determined by a gas chromatography technique. Temperatures of a vent portion, an extruding portion and a die of the employed vent extruder were 250° C, 230° C and 225° C, respectively. A pressure at the vent portion was kept about 9 mmHg abs. The polymer was extruded in the form of strands through a die having 4 circular openings each having a diameter of 1/8 inch, cooled by water and cut into pellets. The percent of residual of each methyl methacrylate and methyl acrylate in the polymerized material so obtained, as measured by gas chromatography, was less than 0.05%.

The pellets were dried at 90° C and $10^{-1}$ mmHg abs. to reduce the water content to less than 0.1%. Using the spinnerette apparatus as shown in FIG. 4, the dried methyl methacrylate copolymer pellets were extruded as a core surrounded by a poly-2,2,2-trifluoroethyl methacrylate having a refractive index of 1.41 as a sheath. The temperature of the die was maintained at 225° C. The extrustion rates of the two polymers were such that the ratio of the core to the sheath was approximately 82:18 by weight and the total extrusion rate was 10 g/min. The extruded composite filament was wound at a rate of 50 m/min.

This sheath-core composite filament had an absorption coefficient (k) of $4.1 \times 10^{-3}$ cm$^{-1}$ and a light transmission of approximately 66% per 1 m.

EXAMPLE 2

Following the general procedure described in Example 1, methyl methacrylate copolymer pellets were prepared wherein a monomer feed essentially consisting of 98 parts of methyl methacrylate, 2 parts of methyl acrylate, 0.29 part of tert.-butyl mercaptan and 0.0017 part (i.e. $0.116 \times 10^{-4}$ mol of the initiator/100 g of the monomer feed) of di-tert.-butyl peroxide (a half life of which at 155° C was 0.55 hour) was processed employing a polymerization temperature of 155° C, a residence time of 4.1 hours and a conversion of 65%. Temperatures of a vent portion, and extruding portion and a die of the vent extruder were 260° C, 240° C and 235° C, respectively.

Using the spinnerette apparatus as shown in FIG. 6, the methyl methacrylate copolymer pellets were extruded into filaments at a rate of 10 g/min, and a temperature of 255° C. The extruded filaments were wound at a rate of 50 m/min. The filaments had an average diameter of 0.5 mm.

Using the apparatus as shown in FIG. 7, the methyl methacrylate copolymer filament was coated with a 30% solution in acetone of a copolymer of 60% by mole of 1,1,1,3,3,3-hexafluoropropyl methacrylate and 40% by mol of 2,2,3,3,4,4,5,5-octafluoropentyl methacrylate. The thickness of the sheath of the resultant composite filament was approximately 10 microns.

The composite filament had an absorption coefficient (k) of $3.0 \times 10^{-3}$ cm$^{-1}$.

EXAMPLE 3

Using the spinnerette apparatus as shown in FIG. 5, the methyl methacrylate copolymer pellets prepared in Example 2 were extruded as a core surrounded by a copolymer composed of 70% by mol of vinylidene fluoride and 30% by mol of tetrafluoroethylene, having a refractive index of 1.40, as a sheath. The temperature of the die was maintained at 257° C. The extrusion rates of the two polymers were such that the ratio of the core to the sheath was 87 : 13 by weight and the total extrusion rate was 10 g/min. The extruded composite filament was wound at a rate of 50 m/min.

This sheath-core composite filament had a diameter of approximately 0.5 mm and exhibited an absorption coefficient (k) of $3.3 \times 10^{-3}$ cm$^{-1}$. The light transmission proved to be uniform over the length of the filament. It should be noted that the composite filament had such an improved light transmission even though it was extruded at a high temperature, i.e. 257° C. This is presumed to be due to the fact that the methyl methacrylate copolymer possesses improved thermal stability.

COMPARATIVE EXAMPLE 1

Using a twin-screw extruder (having two screws with the axes 3 inches apart, each screw having a diameter of 8.5 inches and a length of 49 inches) as a polymerization vessel, a monomer feed containing 100 parts of methyl methacrylate, 0.225 part of di-t-butyl peroxide having a half life of 0.49 hour at 157° C (i.e. $15.4 \times 10^{-4}$ mol of the initiator/100 g of the monomer feed) and 0.35 part of lauryl mercaptan was continuously polymerized. The monomer feed was supplied to a hopper of the extruder at a rate of 82 g/min, and the reaction mixture discharged from the extruder was continuously passed to a devolatilizor. The temperature in the extruder was 157° C, the residence time in the extruder 25 minutes, and the conversion at the time when extruded was 93%. The temperature of the devolatilizor was 260° C. The polymer discharged from the devolatilizor was cooled and pelletized. The percent of residual methyl methacrylate in the pellets was as high as 1.4%. It is believed that at least part of this high percent of residual methyl methacrylate should be attributed to a thermal decomposition of the polymer in the devolatilizor.

Following the procedure described in Example 1, the polymethyl methacrylate pellets were extruded as a core surrounded by a poly-2,2,2,-trifluoroethyl methacrylate similar to that used in Example 1, as a sheath, wherein the temperature of the die was maintained at 245° C and the extrusion rates of the two polymers were such that the ratio of the core To the sheath was approximately 8 : 2 by weight, with all other conditions remaining substantially the same.

The sheath-core composite filament so obtained had a diameter of 0.5 mm and exhibited an absorption coefficient (k) of $13 \times 10^{-3} cm^{-1}$. It is believed that such a poor light transmission of the composite filament should be attributed to the lack of homogeneity of the polymethyl methacrylate and the presence of a monomeric methyl methacrylate produced by the thermal decomposition of the polymethyl methacrylate.

COMPARATIVE EXAMPLE 2

This example is to illustrate the use, as a core, of a methyl methacrylate polymer prepared by a conventional suspension polymerization procedure.

A mixture of 100 parts of methyl methacrylate, 200 parts of water, 0.3 part of n-dodecyl mercaptan, 0.1 part of azobisisobutyronitrile and 0.05 part of polyvinyl alcohol (as a dispersing agent) was maintained at 80° C for 3 hours to prepare a polymethyl methacrylate. The polymethyl methacrylate was thoroughly washed and then dried. The dried polymer was passed to a devolatilizor extruder. The polymer discharged therefrom was cooled and pelletized. The percent residual of methyl methacrylate in the pellets was 0.09%.

Using the spinnerette apparatus as shown in FIG. 4, the polymethyl methacrylate set forth above was extruded as a core surrounded by a vinylidene fluoride-tetrafluoroethylene copolymer similar to that used in Example 3 as a sheath. The extrusion conditions remained substantially the same as those employed in Example 3.

The composite filament so obtained had a diameter of 0.5 mm and exhibited an absorption coefficient (k) of $4 \times 10^{-3} cm^{-1}$ to $15 \times 10^{-3} cm^{-1}$. The light transmission proved to be uneven along the length of the filament. It is believed that such a poor light transmission should be attributed to the unavoidable incorporation of foreign matter into the polymer in the processes spanning from polymerization through pelletization or the presence of the additive of a low molecular weight added to the polymerization system or thermal decomposition products inevitably produced during the extrusion of filament.

EXAMPLE 4

A methyl methacrylate copolymer was prepared following the procedure described in Example 2, and then passed through a devolatilizor extruder which was similar to that used in Example 2, except that the devolatilizor extruder was provided with two spinnerette assemblies. One (A) of the two spinnerette assemblies had a structure suitable for the production of a non-composite strand, and the other (B) had a structure as shown in FIG. 5. The molten methyl methacrylate copolymer stream was divided into two streams in the devolatilizor extruder. One stream was extruded from the spinnerette assembly (A) in the form of a non-composite strand and cooled, and then cut into pellets. The other stream was extruded through the spinnerette assembly (B) as a core surrounded by a molten polymer stream of a vinylidene fluoride-tetrafluoroethylene copolymer as a sheath similar to that used in Example 3, the latter molten polymer stream being fed from another extruder arranged in parallel with the devolatilizor extruder set forth above. The extrusion rates of the two polymers were such that the ratio of the core to the sheath was approximately 90:10 by weight and the total of the core and the sheath was 10 g/min. The temperature of the spinnerette assembly (B) was maintained at 260° C. The extruded composite filament was wound at a rate of 25 m/min. Then the filament was drawn twice the original length to improve the mechanical strength.

The composite filaments so obtained had a diameter of 0.5 mm and exhibited an absorption coefficient (k) of $1.7 \times 10^{-3}$ cm$^{-1}$. The light transmission proved to be substantially uniform over the length of each filament and between the filaments, i.e. the absorption coefficient (k) fell within the range of $1.7 \times 10^{-3} \pm 0.0005$ cm$^{-1}$.

EXAMPLE 5

A molten methyl methacrylate copolymer was prepared following the procedure described in Example 1 wherein a monomer feed consisting essentially of 87 parts of methyl methacrylate, 13 parts of ethyl acrylate, 0.0017 part of di-tert.-butyl peroxide and 0.23 part of n-octyl mercaptan was used.

The molten methyl methacrylate copolymer was passed through an extruder which was similar to that used in Example 4. That is, a part of the molten methyl methacrylate copolymer stream was extruded into a non-composite filament and the other part thereof was extruded as a core surrounded by a molten copolymer stream as a sheath which copolymer consisted essentially of 60% by mole of 2,2,2-trifluoroethyl methacrylate and 40% by mole of 2,2,3,3,4,4,5,5-octafluoropentyl methacrylate and had a refractive index of 1.40. The extrusion rates of the two copolymers formed into the sheath-core composite filament were such that the ratio of the core to the sheath was approximately 80 : 20 by weight and the total of the core and the sheath was 5 g/min. The temperature of the spinnerette assembly for the composite filament was maintained at 210° C. The extruded composite filament was wound at a rate of 80 m/min.

The composite filament so obtained had a diameter of approximately 0.25 mm (the filament core had a diameter of approximately 0.23 mm) and exhibited an absorption coefficient (k) of $2.2 \times 10^{-3}$ cm$^{-1}$. The light transmission of this composite filament was approximately 80% per meter and proved to be substantially uniform over the length of filament.

EXAMPLE 6

A molten methyl methacrylate polymer was prepared following the procedure described in Example 2 wherein a monomer feed consisting essentially of 100 parts of methyl methacrylate, 0.29 part of tert.-butyl mercaptan and 0.0017 part of di-tert.-butyl peroxide was used.

The molten methyl methacrylate was passed through an extruder which was similar to that used in Example 2 and provided with a spinnerette assembly as shown in FIG. 6 having an orifice of 2.5 mm diameter. The extrusion rate was 5 g/min. The winding rate of the extruded filament was set such that the wound filament had a diameter of 1.3 mm. The filament was then drawn 1.8 times its original length and, using the apparatus as shown in FIG. 7, coated with a 33% solution in ethyl acetate of a vinylidene fluoride-tetrafluoroethylene copolymer similar to that used in Example 3. The filament so treated had a diameter of approximately 1 mm and exhibited an adsorption coefficient (k) of $1.2 \times 10^{-3}$ cm$^{-1}$. The light transmission of this filament was approximately 88% per meter.

The above procedure was repeated wherein the winding rate of the extruded polymethyl methacrylate filament was varied such that the wound filament had a diameter of 0.65 mm, with all other conditions remaining substantially the same. The resulting composite filament had a diameter of 0.5 mm and exhibited as absorption coefficient (k) of $1.6 \times 10^{-3}$ cm$^{-1}$. The light transmission of this filament was approximately 85% per meter.

EXAMPLE 7

Following the procedure described in Example 1, a molten methyl methacrylate copolymer was prepared wherein a monomer feed consisting essentially of 93.5 parts of methyl methacrylate and 6.5 parts of methyl acrylate, 0.0017 part of di-tert.-butyl peroxide and 0.21 part of n-octyl mercaptan was used, with all other conditions remaining substantially the same. The molten methyl merthacrylate copolymer so prepared was extruded in a manner similar to that in Example 6 to prepare a filament having a diameter of 0.6 mm. The filament was drawn 1.5 times its original length and, using the coating apparatus as shown in FIG. 7, coated with a 40% solution in ethyl acetate of a fluorine-containing copolymer similar to that used in Example 5. The composite filament so prepared had a diameter of 0.5 mm. Thickness of the sheath was approximately 12 microns. The composite filament exhibited an absorption coefficient (k) of $2.8 \times 10^{-3}$ cm$^{-1}$.

EXAMPLE 8

Following the procedure described in Example 1, a molten methyl methacrylate copolymer was prepared wherein a monomer feed consisting essentially of 93.8 parts of methyl methacrylate, 6.2 parts of ethyl acrylate, 0.32 part of tert.-butyl mercaptan and 0.002 part of di-tert.-butyl peroxide was used, with all other conditions remaining substantially the same. The molten methyl methacrylate copolymer so prepared was extruded at 225° C into a filament having a diameter of 1.3 mm in a manner similar to that described in Example 7. The filament was drawn 1.8 times its original length and coated with a solution of a fluorine-containing polymer in a manner similar to that described in Example 7. The composite filament so prepared had an absorption coefficient (k) of $2.2 \times 10^{-3}$ cm$^{-1}$.

What is claimed is:

1. A sheath-core composite filament having improved light transmission and having an absorption co-efficient(k) of $1.0 \times 10^{-3}$cm$^{-1}$ to $2.8 \times 10^{-3}$cm$^{-1}$ at a filament core diameter of 0.5 mm, formed of a core material consisting of a methyl methacrylate polymer containing at least 80% by weight of units derived from methyl methacrylate and a sheath material consisting of a fluorine-containing polymer, containing at least 305 by weight of fluorine and having a refractive index of at most 1.42 characterized in that said sheath-core composite filament is formed by the procedure wherein the methyl methacrylate polymer and the fluorine-containing polymer are melt-extruded in a way such that the methyl methacrylate polymer is concentrically surrounded by the fluorine-containing polymer and then, the obtained sheath-core composite filament is drawn 1.3 2.5 times its original length or the procedure wherein the methyl methacrylate polymer is melt-extruded into a filament and the filament is drawn 1.3 to 2.5 times its original length and thereafter coated with the fluorine-containing polymer, and said methyl methacrylate polymer is prepared by the procedure of continuous bulk polymerization at a relatively high temperature and subsequent removal of volatile contents, wherein a monomer feed, containing 0.01 to 1.0% by mol of a mercaptan and a free radical initiator in such a concentration that "A", which is a concentration of the free radical initiator in the monomer feed in terms of number of moles of the initiator present in 100 g of the monomer fed, and "B", which is a half life in hours of the free radical initiator at a polymerization temperature, satisfy the following relations: $10 \geq A^{1/2} \cdot B^{-1/2} \times 10^3$, $3 \geq A \cdot B \times 10^5$ and $2.9 \geq A^{-1}(B + 10.3) \times 10^{-6}$ is continuously fed to a polymerization zone, a reaction mixture in said polymerization zone being thoroughly stirred and kept at a temperature of above 130° C and below 160° C, while maintaining a polymer content $\phi$ (in % by weight) in said reaction mixture substantially constant and so as to satisfy the following relation:

$$50 < \phi < 70 \exp(0.0121T - 1.81)$$

wherein T represents the polymerization temperature in ° C, thereby effecting polymerization, continuously withdrawing the reaction mixture from the polymerization zone and finally continuously removing volatile contents mainly composed of unreacted monomers; and said fluorine-containing polymer being at least one polymer selected from the group consisting of poly-2,2,2-trifluoroethyl methacrylate, a homopolymer or copolymer of a compound having the structure

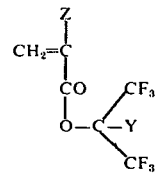

wherein Z is CH$_3$ or H and Y is CF$_3$ or H, a homopolymer or copolymer of 2,2,3,4,4,4-hexafluorobutyl methacrylate and a copolymer of 60 to 80 mole % of vinylidene fluoride and 20 to 40 mole % of tetrafluoroethylene.

2. A sheath-core composite filament according to claim 1 wherein said reaction mixture is kept at a temperature of above 140° C and below 160° C.

3. A sheath-core composite filament according to claim 1 wherein said methyl methacrylate polymer consists essentially of 80 to 100 % by weight of units derived from methyl methacrylate and 0 to 20 % by weight of units derived from at least one monomer selected from the group consisting of alkyl acrylates having 1 to 18 carbon atoms in the alkyl group and alkyl methacrylates having 2 to 18 carbon atoms in the alkyl group.

4. A sheath-core composite filament according to claim 1 wherein said methyl methacrylate polymer consists essentially of 80 to 100 % by weight of units derived from methyl methacrylate and 0 to 20 % by weight of units derived from at least one alkyl acrylate selected from the group consisting of methyl acrylate, ethyl acrylate and butyl acrylate.

5. A sheath-core composite filament according to claim 1 wherein said methyl methacrylate polymer consists essentially of 85 to 100 % by weight of units derived from methyl methacrylate and 0 to 15 % by weight of units derived from at least one monomer selected from the group consisting of alkyl acrylates having 1 to 18 carbon atoms in the alkyl group and alkyl methacryates having 2 to 18 carbon atoms in the alkyl group.

6. A sheath-core composite filament according to claim 1 wherein said monomer feed is continuously fed to a polymerization zone in one single reactor.

7. A sheath-core composite filament according to claim 1 wherein said fluorine-containing polymer is a copolymer consisting essentially of 60 to 80 % by mole of units derived from vinylidene fluoride and 20 to 40 % by mole of units derived from tetrafluoroethylene.

8. A sheath-core composite filament according to claim 1 wherein the filament core is prepared by feeding the methyl methacrylate polymer continuously withdrawn from the step of removing volatile contents in the form of strand, directly to the spinning apparatus for melt-extruding the methyl methacrylate polymer.

9. A sheath-core composite filament according to claim 1 which is prepared by melt-extruding said methyl methacrylate polymer as a core concentrically surrounded by said fluorine-containing polymer as a sheath.

10. A sheath-core composite filament according to claim 1 which is prepared by melt-extruding said methyl methacryate polymer into a filament and coating the extruded filament with a solution of said fluorine-containing polymer.

11. A sheath-core composite filament according to claim 10 wherein the extruded methyl methacrylate polymer filament is coated with a solution of a polymer of a fluorinated ester of methacrylic acid of the formula $$CH_2=C(CH_3)\text{-}CO\text{-}O\text{-}C(CF_3)_2Y$$

wherein Y is either $CH_3$ or H, dissolved in 1,1,2-trifluoro-1,2,2-trichloroethane or ethyl acetate; or a solution of a copolymer consisting essentially of 60 to 80 % by mole of units derived from vinylidene fluoride and 20 to 40 % by mole of units derived from tetrafluoroethylene, dissolved in ethyl acetate.

* * * * *